Sept. 14, 1965  R. C. LONGSWORTH  3,206,147
MOTOR MOUNTING MEANS

Filed Dec. 15, 1961  2 Sheets-Sheet 1

*INVENTOR.*
RALPH C. LONGSWORTH.
BY
ATTORNEY.

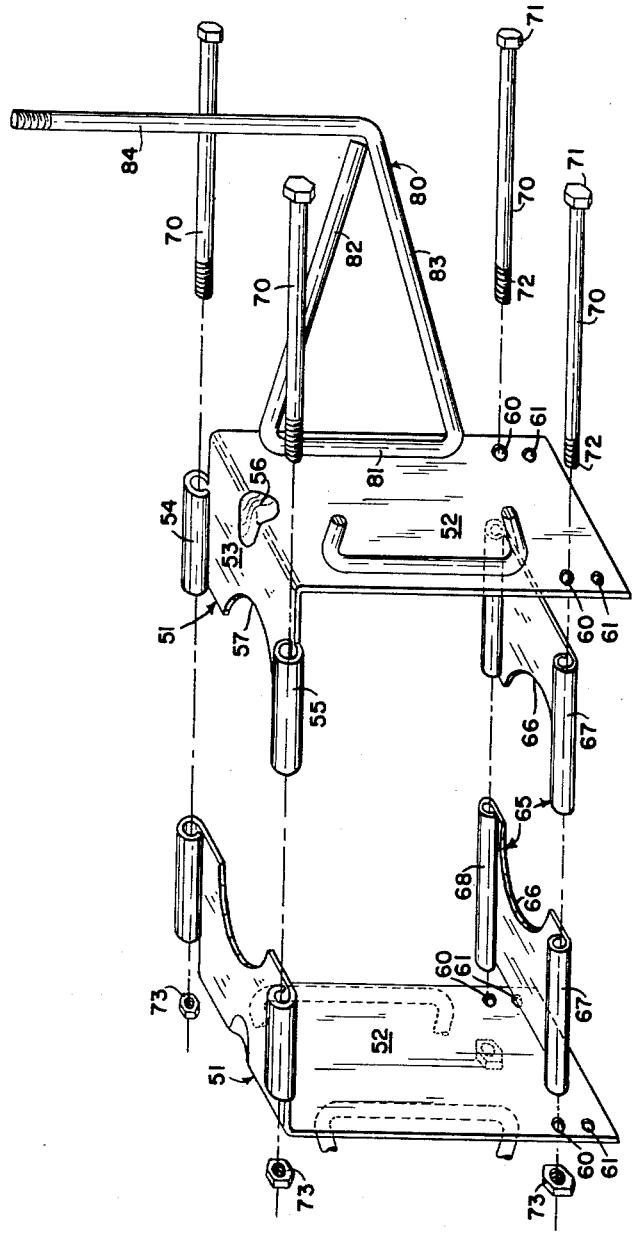

United States Patent Office 3,206,147
Patented Sept. 14, 1965

3,206,147
MOTOR MOUNTING MEANS
Ralph C. Longsworth, Syracuse, N.Y., assignor to Carrier Corporation, Syracuse, N.Y., a corporation of Delaware
Filed Dec. 15, 1961, Ser. No. 159,632
4 Claims. (Cl. 248—18)

This invention relates to air conditioning, more particularly to motor mounts for the fan motors utilized in air conditioning systems.

As is the case with all motor mountings, so particularly in the case of air conditioning installations, it is desirable to provide a motor mount which will serve to securely support the motor in operative position during shipment and normal use; and at the same time isolate the motor so that vibrations of the other equipment will not be transmitted thereto, and similarly vibrations of the motor will not be transmitted to the other equipment. Where a motor is employed for driving a fan, maximum efficiency is obtained by utilizing a common fan shaft and motor shaft. This requires that the motor be maintained in alignment with the fan so as to minimize bearing wear and so as to obtain maximum fan efficiency. Where fans and fan motors are factory assembled with the other components of air conditioning equipment, production efficiency and economy results. If during shipment of the assembled air conditioning equipment from the factory to the site of installation, the fan motor is shocked or jolted out of alignment, as may readily occur in normal shipping procedures, there is a resultant loss of the economies attained by factory production.

A further problem is encountered in providing a motor mount for a fan drawing air along a vertical axis. In an air conditioning installation, a horizontally positioned orifice panel requires that the fan rotate about a vertical axis, and, where the motor is suspended from the orifice panel, provision of the necessary blade clearance between the motor mount and the blades is often a problem.

It is with the above desiderata and problems in mind that the present means have been evolved, means providing a motor mount which serves to support the motor securely in a fixed, aligned, and balanced position, and in isolation so that motor vibrations and shock loads are not transmitted to the other components of the equipment and vice versa. Additionally vertical fan mounting is attainable with necessary fan blade clearance.

It is accordingly a primary object of this invention to provide an improved motor mount.

Another object of this invention is to provide an improved fan motor mount for use in conjunction with air conditioning equipment.

An additional object of the invention is to provide a motor for supporting a fan motor in combination with a horizontal orifice panel.

It is also an object of this invention to provide an improved fan motor mount which will serve to support the fan motor in an aligned balanced orientation with respect to the fan and the other components of the equipment.

A further object of the invention is to provide a fan motor mount permitting the fan to rotate about a vertical axis.

Another object of the invention is to provide a motor mount capable of accommodating differently dimensioned motors.

An additional object of the invention is to provide a motor mount serving to support a motor in vibration free isolation.

These and other objects of the invention which will become hereafter apparent are attained by forming the motor mount of two channel shaped bracket members oriented with the channel openings facing each other and with the channel legs securable with respect to each other to permit the channels to be joined. Suitable fastening members are provided for joining the channels in a fixed position with respect to the motor. A novel supporting bar having a mounting arm, a spring arm, and an engaging arm is secured to the channel members to support same. In use, the positioning of a motor in the support formed by the telescoping channels, and the mounting of the channel enclosed motor by the supporting bar serves to maintain the motor in balanced alignment and vibration free isolation, with the spring arm providing needed fan blade clearance.

An important feature of the invention resides in the formation of the supporting bar with a spring arm or leg structure between the mounting leg or arm and engaging leg or arm so as to provide desired flexibility of support and additionally providing fan blade clearance.

Another important feature of the invention resides in the fact that the channel brackets in assembled relationship form a flat top surface which enables a slinger ring on the motor shaft to keep water out of the top bearing of the motor thus eliminating the need for a drip cover in vertical motor installations.

An important feature of one embodiment of the invention resides in the formation of one of the channel shaped brackets with a removably securable leg, thereby permitting both adjustment and the use of identical symmetrical components.

The specific details of two embodiments of the invention and their mode of functioning, will be made most manifest in clear, concise and exact terms in conjunction with the accompanying drawings, wherein:

FIG. 3 is an exploded perspective view of another embodiment of the invention in which the novel motor mount is formed of two symmetrical identical bracket members.

Referring now more particularly to the drawings, like numerals in the various figures will be employed to designate like parts.

Figure 2:
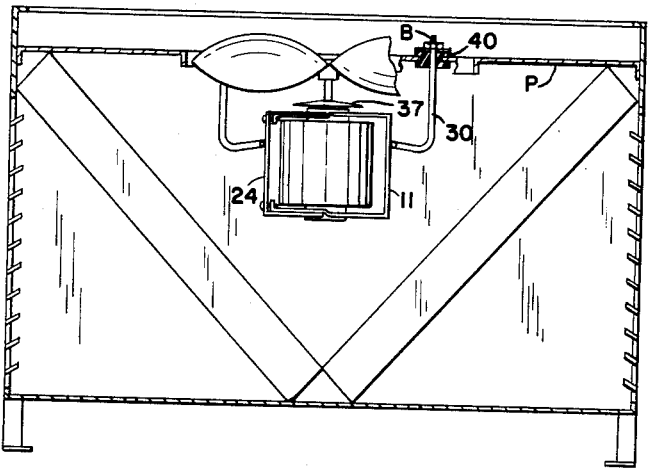
FIG. 2 is a front elevational view of the novel motor mount of FIG. 1.
Figure 1:
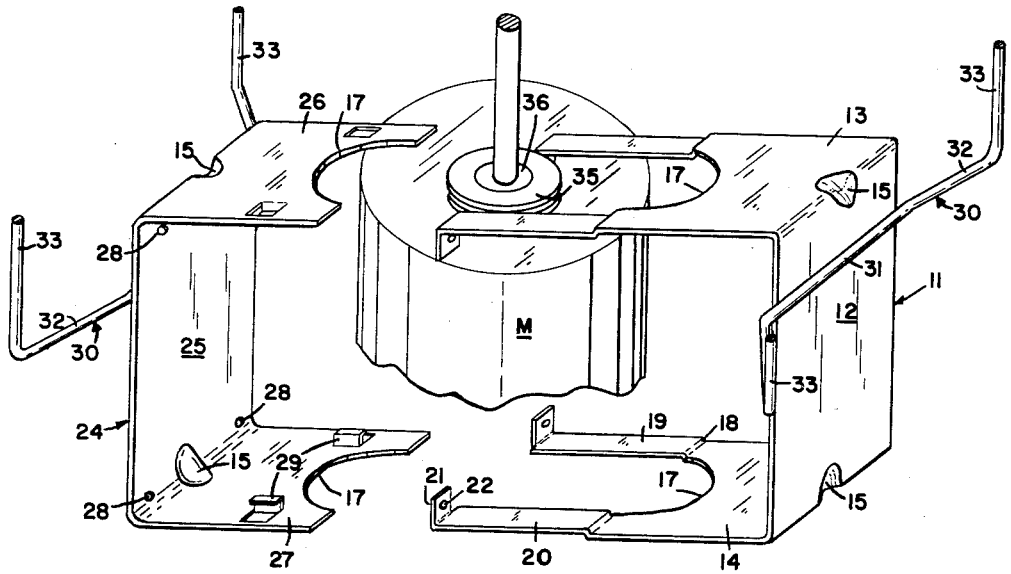
FIG. 1 is an exploded perspective view of a motor shown in position prior to assembly with one embodiment of the novel motor mount.

In the embodiment of the invention illustrated in FIGS. 1 and 2, a first channel shaped bracket member 11, as seen to the right in the drawings, is formed with a base 12 and opposed legs 13 and 14 extending at right angles to the base on the same side thereof. Reinforcing tooling 15 is employed to strengthen the channel structure along the line of intersection between the legs and the base. A semi-circular cutout 17 having a diameter substantially equal to that of the collar of the motor housing is formed in each of the legs of the channel. From offsets 18, extending in the same direction as the legs 13 and 14 in a plane slightly displaced therefrom, are a pair of spaced telescoping fingers 19 and 20, one pair joined to each leg 13 and 14 immediately adjacent the end of the semi-circular cutout 17. Securement flanges 21 are formed at the end of each finger, and bolt holes 22 are formed therein.

A second channel shaped bracket member 24 as seen to the left in the drawing comprises a base 25 and opposed legs 26 and 27 similar to legs 13 and 14 respectively of first channel shaped bracket 11. Bolt holes 28 adapted for alignment with bolt holes 22 are formed in base 25 of bracket 24. Tracks 29 are formed by stamping legs 26 and 27. These tracks are shaped apart to accommodate fingers 19 and 20 in the assembled mount, as will become hereinafter more apparent. The semi-circular cutouts 17 are formed similar to those on legs 13 and 14. The spacing between legs 26 and 27 is equal to the spacing between legs 13 and 14 so that when the brackets are assembled into the operative relationship shown in FIG. 2, a flush surface is formed between the exterior portions of legs 27 and 14, and legs 26 and 13, respectively.

Secured by welding, or any other suitable fastening means, to the inside or outside of bases 12 and 25 respectively are supporting bars 30. Each supporting bar 30 has an engaging arm 31 secured to the base of the bracket member, a downwardly and outwardly extending spring arm 32 on each end of said engaging arm; and an upwardly extending mounting arm 33 formed at the extremities of the spring arms 32. The free ends of mounting arms 33 are threaded to receive bolts suitable for anchoring of the assembled mount of a support element, which in the case of an air conditioning installation will be an orifice panel.

The motor M which is to be supported by the novel mount is provided with a grooved resilient ring 35 about the motor housing collar 36, ring 35 adapted to lie within cutout 17 in the assembled mounted motor. It will be understood that a ring 35 is arranged at each end of the motor housing for receipt within cutout 17 at both ends of the motor. In the assembled mounted motor a slinger ring 37 formed of plastic or the like is secured to the motor shaft above the top legs 14 and 27 respectively of the mount brackets to dispel any moisture which may otherwise drip down into the motor bearing.

In the embodiment of the invention illustrated in FIG. 3, a first channel shaped bracket member 51 as seen to the right in the drawing is formed with a base 52 and a top leg 53 secured to the base 52 and extending at right angles therefrom. Leg 53 has bolt sleeves 54 and 55 formed at opposed edges thereof for a purpose to be made hereafter more apparent. Reinforcing tooling 56 is employed between leg 53 and base 52 as previously described in connection with tooling 15. Semi-circular cutout 57 having a diameter substantially equal to that of the collar of the motor housing is formed on leg 53 similar to previously described cutout 17.

A second bracket member 51 identical in all respects to the one here described as on the right of the drawing is provided for coupling to this first described channel for assembly into the motor mount.

Base 52 is provided with spaced pairs of bolt holes 60 and 61 extending through the base 52 at the end thereof opposite to the point of attachment of channel leg 53.

Legs 65 adapted for removable and adjustable securement to base 52 of bracket 51 are provided which are substantially identical in configuration to previously described legs 53. A cutout 66 is formed in these legs 65 to accommodate the motor collar; and bolt sleeves 67 and 68 are formed at opposite edges of legs 65. These legs 65 are, as viewed in the drawing, adapted for securement to the base 52 of channel 51. Securement of the channel members into assembled relationship with respect to each other, and in operative position with respect to the supported motor, is accomplished by means of bolts 70, it being recommended that at least one bolt be provided for each corner of the mount, four being used in the illustrated embodiment. Bolts 70 have heads 71 and threaded ends 72. In use the bolts are extended through bolt holes 60 or 61 of the first channel member depending on the length of the motor to be supported, threaded through bolt sleeves 67 and 68 of legs 65, thence through the bolt holes 60 or 61 of the second channel member, and secured by means of nuts 73.

Secured by welding or the like to the outer surface of plates 52 of channels 51 are supporting bars 80 as best seen to the right of FIG. 3. Each supporting bar 80 is provided with an engaging arm 81 fastened to the plate 52, spring arms 82 and 83 extending from the ends of engaging arm 81, and a mounting arm 84 formed integral with and extending upwardly from the lower spring arm 83. Two of these supporting bars 80 are secured to each base 52 of channel 51.

In use, the aforedescribed components are assembled into the operative structure illustrated in FIG. 2. The motor is arranged so that the rings 35 lie cradled within cutouts 17. The rings 35 will be understood to be made of a suitable shock absorbing resilient material. The mounting brackets 11 and 24 are assembled by drawing legs 26 and 27 over the surface of fingers 19 and 20 sliding fingers 19 and 20 outside tracks 29. Suitable fastening bolts are extended through bolt holes 28 and openings 22 and have nuts applied thereto to secure the parts against separation. If desired, self-tapping sheet metal screws may be employed for the same purpose.

The entire assembly is held in operative position with respect to any air conditioning installation by securing the mounting arms 33 of the supporting bar to an appropriate supporting surface. In most installations this will be the orifice panel P of the fan.

Appropriate resilient washers 40 may be employed about the threaded ends of the mounting arms 33 between the bolt B and the panel P as best seen in FIG. 2. It will be observed that spring legs 32 serve the twofold function of providing resilience for the mount to take up any transmitted shock load, and simultaneously permit the necessary clearance for the fan blades.

In the embodiment of the invention illustrated in FIG. 3, the novel mount is arranged in assembled operative relationship by positioning the motor so that its axis extends between the cutouts 57 and 66 of channel legs 53 and 65 respectively. The bolts 70 are extended as described through the bolt sleeves 54 and 55, in the case of the upper bolts; and through bolt holes 60 or 61 and bolt sleeves 67 and 68 with respect to the lower removable channel legs 65.

It will be observed that the structure of the embodiment of the mount illustrated in FIG. 3 provides for greater flexibility of use in that a single mount may be employed to accommodate differently dimensioned motors. Thus a longer motor will be accommodated by utilizing the lower bolt hole 61, whereas a shorter motor will be accommodated by using the upper bolt hole 60. As will be apparent to those skilled in the art additional bolt holes may readily be provided. A variation in motor thickness may be accommodated by changing the length of bolt 70.

It will further be observed that the structure illustrated in FIG. 3 utilizes symmetrical channel halves thus implementing manufacture, and distribution.

In operation after the mount is assembled with respect to the motor, additional strength is provided by the use of two spring arms 82 and 83. It will be seen that arm 82 bears freely against the juncture of spring arm 83 and mounting arm 84.

It is thus seen that a simple, inexpensive, readily assembled motor mount has been provided adapted particularly for an air conditioning installation in which necessary fan blade clearance is provided, and motor alignment and balance may be obtained, with the motor maintained in vibration free isolation.

While I have described a preferred embodiment of the invention, it will be understood the invention is not limited thereto since it may be otherwise embodied within the scope of the following claims.

I claim:

1. A fan motor mount comprising: a first bracket member; bolt sleeves on said bracket member; a leg removably securable to said bracket member; a second bracket member identical to said first bracket member; a bolt extensible through said bolt sleeves to maintain said first and second bracket members in assembled relationship; a first supporting bar secured to said first bracket member, and a second supporting bar secured to said second bracket member.

2. A fan motor mounted as in claim 1 in which a removably securable leg is provided for both said first and said second bracket member; and a bolt sleeve is formed at the edges of each of said removably securable legs through which a bolt may be extended to maintain said bracket members in operative relationship with respect to each other.

3. A fan motor mount as in claim 2 in which said first and second bracket member comprises: a base having a plurality of spaced bolt holes through which bolts may be extended through said bolt sleeves of said detachably securable legs.

4. A fan motor mount as in claim 1 in which said supporting bar comprises: an engaging arm secured to said bracket member; an upper spring arm extending from said engaging arm; a lower spring arm extending outwardly and upwardly from said engaging arm; and a mounting arm extending from one of said spring arms.

References Cited by the Examiner

UNITED STATES PATENTS

| | | | |
|---|---|---|---|
| 1,715,669 | 6/29 | Nuttall | 230—273 |
| 1,739,082 | 12/29 | Simmons et al. | 230—273 X |
| 1,761,752 | 6/30 | Scott | 230—273 X |
| 2,057,370 | 10/36 | Dehlendorf | 310—51 |
| 2,096,621 | 10/37 | Skolfield | 230—273 |
| 2,126,599 | 8/38 | Anderson | 230—273 |
| 2,386,503 | 10/45 | Cressley | 248—18 |
| 2,432,291 | 12/47 | Dayton | 310—51 |
| 2,557,223 | 6/51 | Hans | 230—273 |
| 2,647,591 | 8/53 | Young | 248—18 |
| 2,660,037 | 11/53 | Cooper | 248—18 |
| 2,686,630 | 8/54 | Burrows | 230—235 |
| 2,707,088 | 4/55 | Shelton | 248—18 |
| 2,728,541 | 12/55 | Hansel | 230—273 X |
| 2,748,945 | 6/56 | Lodge | 248—18 |

LAURENCE V. EFNER, *Primary Examiner.*